Dec. 15, 1931. F. R. TOMLINSON Re. 18,285

UNITARY VALVE AND MIXING CHAMBER

Original Filed May 31, 1924

Inventor

Frank R. Tomlinson.

By Frank C. Karman

Attorney

Reissued Dec. 15, 1931 Re. 18,285

UNITED STATES PATENT OFFICE

FRANK R. TOMLINSON, OF BAY CITY, MICHIGAN

UNITARY VALVE AND MIXING CHAMBER

Original No. 1,594,648, dated August 3, 1926, Serial No. 717,022, filed May 31, 1924. Application for reissue filed July 28, 1928. Serial No. 296,023.

This invention relates to mixing valves and the like and particularly to a valve for use where both hot and cold water connections are available.

One object of the invention resides in the provision of a device whereby cold and hot water may be admitted to a mixing chamber in the proportions required to provide water of the desired temperature, or whereby either hot or cold water may be discharged independently of the other.

Another object is to provide means whereby hot or cold water, or water of medium temperature may be secured by use of but one valve or faucet.

A further object is to design a very simple, substantial and economical mixing valve for use in hotels, homes and in fact anywhere that it is desired to provide water at different temperatures at the pleasure of the user.

A still further object is to provide a mixing chamber having hot and cold water inlets and also provide unitary controlling means for regulating the water admitted to the mixing chamber and controlling the discharge of the mixed water after the mixing has been effected.

The above and other objects will appear as the specification progresses, reference being had to the accompanying drawings, in which like reference numerals indicate like parts throughout the several views thereof.

Figure 1:
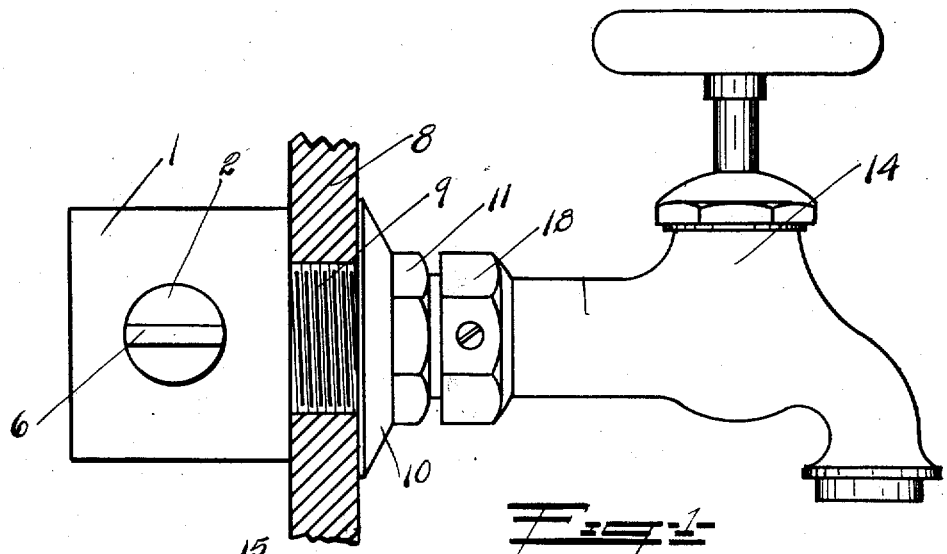
Fig. 1 is a side view of my improved valve.
Figure 2:
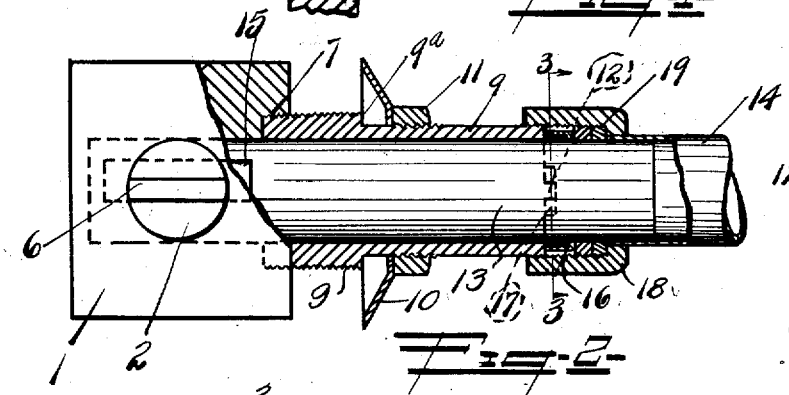
Fig. 2 is also a part section fragmentary side view thereof.
Figure 3:
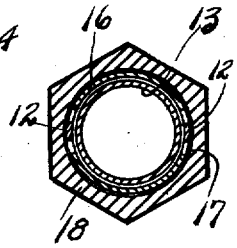
Fig. 3 is an end view taken on the line 3—3 of Fig. 2.
Figure 4:
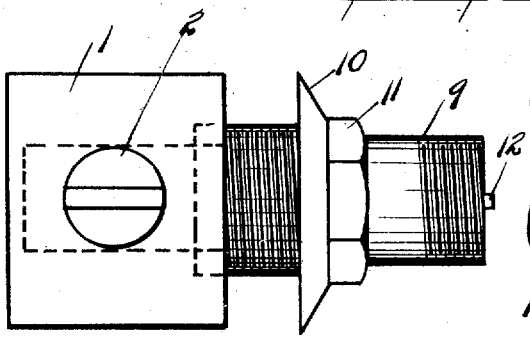
Fig. 4 is a detail side view of the mixing chamber and nipple connection.
Figure 5:
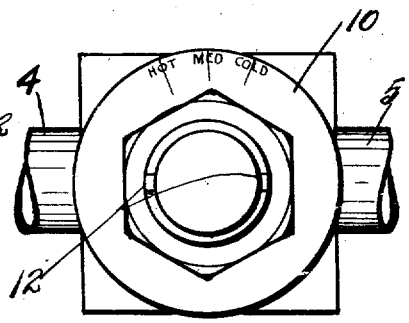
Fig. 5 is a front view thereof.
Figure 6:
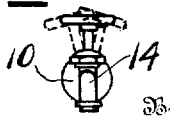
Fig. 6 is also a front view of the valve, showing in full lines the position of the valve when discharging water of medium temperature, the dotted lines illustrating the positions when discharging hot or cold water.

In hotels and public buildings where both hot and cold water connections are available, it is customary to provide two valves, the water discharging into a basin, the valves being regulated so that the water of the desired temperature is provided.

For sanitary reasons when shaving, washing, etc., it is desirable to take water directly from the faucet, and before it discharges into the basin, and where the hot and cold water discharge from individual faucets, this is not possible as the water is either too hot or too cold, and I have therefore designed a combined sanitary valve and mixing chamber, by means of which water of any desired suitable temperature can be secured, by merely rotating the valve slightly in one direction or the other.

Referring now particularly to the drawings in which I have shown the preferred embodiment of my invention, the numeral 1 indicates a mixing chamber having openings 2 and 3 on opposite sides thereof, both of which are internally threaded to receive pipes 4 and 5 respectively which connect with the hot and cold water reservoirs respectively, said openings terminating in elongated slotted openings 6 communicating with the centrally disposed passage 7 formed in the mixing chamber.

In the present illustration the device is shown in connection with an ordinary household sink, the back of which is indicated by the numeral 8, and against which the mixing chamber is placed.

A pipe nipple 9 extends through a suitable opening in the back of the sink and is threaded into the centrally disposed passage 7 of the mixing chamber, a shoulder 9[a] being provided intermediate the length of this nipple 9 and a washer 10 is mounted thereon and is held tightly in position against the sink by means of a nut 11 as shown, the end of this nipple 9 being externally threaded and formed with spaced apart projecting shoulder portions 12 for a purpose to be presently described.

A sleeve member 13 is brazed to a conventional faucet 14, and this can be of any preferred type, either self closing or hand manipulated, the sleeve 13 extending through the nipple 9 and into the mixing chamber, and being formed with spaced apart elongated slots 15 adapted when the valve is in upright position to register with the hot and cold water connections.

A collar 16 is formed integral with or otherwise secured to this member 13 intermediate its ends, and is formed with slotted portions 17 which are adapted to register with and receive the shoulder portions 12 formed on the nipple 9, a packing nut 18 being fitted over said collar, and being threaded onto the end of the nipple 9, a suitable washer and packing 19 being interposed to form a water tight joint, and it will be obvious that the width of the slots 17 determines the degree of rotation of the valve, the washer 10 having suitable indicia thereon to indicate when the valve is turned to position to discharge hot, cold, or warm water.

The slots in the sleeve 13 are of course somewhat wider than the openings 6 and are so spaced that when the handle of the valve is in vertical position both hot and cold water in equal proportions is admitted to the passage 7, but when the handle is swung or rotated, one slot remains open while the opposite slot, which admits water from the opposite supply pipe is being closed and vice versa, the discharge of this mixed water being controlled by the valve in the faucet.

From the foregoing description it will be obvious that I have perfected a very simple, cheap and convenient unitary valve and mixing chamber for securing water of any desired temperature from but one faucet.

What I claim is:—

1. In a device of the character described, a mixing chamber formed with a central passage, slotted inlet ports communicating therewith, a nipple threaded into said mixing chamber, a sleeve mounted in said nipple and extending into said passage and having slots adapted to register with said ports when turned to predetermined positions, and means for limiting the rotation of said sleeve.

2. In a device of the character described, a mixing chamber having a centrally disposed passage, hot and cold water slotted inlet ports opening thereinto, a nipple threaded into said mixing chamber, and a sleeve rotatably mounted in said nipple and extending into said passage, said sleeve being provided with slots adapted in a certain position to register with said ports.

3. The combination with a faucet, of a mixing chamber having a centrally disposed passage, slotted ports opening thereinto, a nipple secured to said chamber, a sleeve rotatably mounted therein and extending into said passage for controlling said ports, a collar fixed on said sleeve, and means on the nipple adapted to engage the collar for limiting the rotation thereof.

4. The combination with a faucet of a mixing chamber having a centrally disposed passage, slotted hot and cold water ports opening thereinto, a nipple secured to said chamber and provided with shoulders on the outer end thereof, a sleeve rotatably mounted in said nipple, means on said sleeve adapted to engage the nipple for limiting the rotation of said sleeve and means for providing a water tight joint between the nipple and the sleeve.

5. The combination with a faucet, of a mixing chamber formed with a centrally disposed passage, slotted hot and cold water connections opening thereinto, a nipple secured to said mixing chamber and provided with spaced apart shoulders on the end thereof, a sleeve mounted therein and extending into said passage, spaced apart openings in the sleeve adapted to communicate with said water connections, a collar on the opposite end of the sleeve and formed with cut away portions adapted to receive said shoulders, and means for providing a water tight joint between the nipple and the faucet.

6. In a device of the character described, a mixing chamber having hot and cold water ports, a sleeve extending into the mixing chamber and capable of rotary movement for controlling said ports, a valve on said sleeve for regulating the discharge of water from said chamber, a fixed sleeve surrounding the said sleeve, and a collar carried by the rotary sleeve and located at one end of the fixed sleeve, said collar and rotary sleeve having cooperating means arranged to abut for limiting the movement of the rotary sleeve.

In testimony whereof I hereunto affix my signature.

FRANK R. TOMLINSON.